US005122025A

United States Patent [19]

Glomski

[11] Patent Number: 5,122,025

[45] Date of Patent: Jun. 16, 1992

[54] MULTIPLE COMPARTMENT BODY FOR WASTE PRODUCTS AND THE LIKE

[75] Inventor: Norman J. Glomski, Chattanooga, Tenn.

[73] Assignee: The Heil Co., Milwaukee, Wis.

[21] Appl. No.: 642,146

[22] Filed: Jan. 15, 1991

Related U.S. Application Data

[63] Continuation of Ser. No. 268,581, Nov. 8, 1988, abandoned.

[51] Int. Cl.[5] .......... B65G 67/04

[52] U.S. Cl. .......... 414/486; 414/408; 414/409; 414/525.4; 414/517; 298/23 M; 298/8 R; 410/134; 220/1.5; 220/501; 220/502; 220/531; 220/534

[58] Field of Search .......... 414/491, 492, 486, 487, 414/406, 407, 408, 409, 512, 525.51, 517, 525.4, 525.6; 296/184, 183, 1.1, 10; 220/1.5, 501, 502, 534, 531; 105/404, 359; 410/129-141, 68, 54; 298/23 M, 23 D, 23 R, 8 R

[56] References Cited

U.S. PATENT DOCUMENTS

| | | | |
|---|---|---|---|
| 1,379,007 | 5/1921 | Fernandez | 414/409 |
| 3,111,346 | 11/1963 | Harbers et al. | 298/23 M X |
| 3,211,312 | 10/1965 | Miller | 414/406 |
| 3,318,231 | 5/1967 | Felts | 414/517 X |
| 3,366,255 | 1/1968 | Evans, Jr. | 414/517 X |
| 3,516,562 | 6/1970 | Knight | 414/408 |
| 3,641,941 | 2/1972 | Sanders | 410/134 |
| 3,666,126 | 5/1972 | Rempel | 414/408 |
| 3,921,839 | 11/1975 | Herpich | 414/525.6 X |
| 4,639,031 | 1/1987 | Truckenbrodt | 410/130 |
| 4,687,405 | 8/1987 | Olney | 414/408 |
| 4,840,531 | 6/1989 | Dinneen | 414/409 |

FOREIGN PATENT DOCUMENTS

| | | | |
|---|---|---|---|
| 184739 | 6/1986 | European Pat. Off. | 414/409 |
| 0231848 | 8/1987 | European Pat. Off. | |
| 0252707 | 1/1988 | European Pat. Off. | |
| 292646 | 6/1916 | Fed. Rep. of Germany | 414/409 |
| 2723278 | 11/1978 | Fed. Rep. of Germany | 414/525.51 |
| 3231002 | 3/1983 | Fed. Rep. of Germany | 414/525.6 |
| 3510700 | 9/1986 | Fed. Rep. of Germany | 414/517 |
| 3537546 | 4/1987 | Fed. Rep. of Germany | 414/512 |
| 905151 | 2/1982 | U.S.S.R. | 414/408 |
| 2016403 | 9/1979 | United Kingdom | 410/136 |
| 2080757 | 2/1982 | United Kingdom | 414/408 |

OTHER PUBLICATIONS

Trade brochure Labrie Equipment Company (Hydraulic Over Top Loading Recycler).

Trade brochure Perkins Manufacturing Company (Renda Cycler).

Trade brochure Labrie Equipment Company (Rudco 1615-HLD Hi-Lilt Dump Recycler).

Trade brochure Labrie Recycling Truck and Body.

Trade brochure Galbreath Recycling Dump body.

*Primary Examiner*—Frank E. Werner
*Attorney, Agent, or Firm*—Paul R. Puerner

[57] ABSTRACT

A multiple compartment body comprises a housing having walls defining an interior storage area. An interior wall extends within the interior storage area for defining at least two compartments within the interior storage area. The interior wall is attached for movement between a position opening communication between the compartments and a position closing communication between the compartments. The interior wall is also movable within the interior storage area to selectively alter the respective sizes of the compartments. Movement of the interior wall is accomplished in response to fluid pressure from a location outside the housing.

3 Claims, 3 Drawing Sheets

MULTIPLE COMPARTMENT BODY FOR WASTE PRODUCTS AND THE LIKE

This is a continuation of copending application Ser. No. 07/268,581 filed on Nov. 8, 1988, now abandoned.

FIELD OF THE INVENTION

The invention generally relates to structures having two or more interior chambers, the size of which can be selectively adjusted. The invention also generally relates to waste collection systems and assemblies.

BACKGROUND OF THE INVENTION

Many glass, paper, cloth, and metal waste materials can be recycled for reuse. For both ecological and economical reasons, the separate collection of these recyclable (or reclaimable) materials is becoming more and more widespread.

Multiple chamber waste collection systems for use in collecting different types of recyclable waste materials are known. Typically, one or more interior partitions are used to form compartments within an interior waste storage area for receiving and segregating the different types of materials. In some arrangements, the partitions can be moved to adjust the size of the compartments. Movement of these partitions is accomplished manually or by the use of external equipment, such as a crane. The movement of the partitions therefore tends to be cumbersome and time consuming. It typically involves more than a single operator and cannot be easily accomplished at a curb-side location.

There is thus a demand for improved, less labor intensive systems for the collection and segregation of different recyclable waste materials.

SUMMARY OF THE INVENTION

One aspect of the invention provides a multiple compartment body comprising a housing having walls defining an interior storage area. The interior storage area is partitioned to create at least two compartments within the interior storage area. The interior partition is moveable to selectively alter the respective sizes of the compartments. The movement of the partition is automatically controlled from a location outside the housing, without reliance upon any external equipment like a crane. In a preferred embodiment, the interior partition is movable in response to fluid pressure, such as hydraulic pressure, and can be selectively located within a broad range of positions.

The invention thus provides a body having two or more interior compartments the size of which can be automatically adjusted by a single operator using self-contained controls located outside the body. Further, the invention provides an almost unlimited degree of flexibility in tailoring the size of the compartments to the particular task at hand.

In one embodiment, the body is itself movable with respect to a support frame between a load position and an unload position. In the load position, waste materials can be loaded into the interior storage area. The invention provides means carried by the support frame for loading waste materials into a selected one or more of the compartments, which means can be automatically operated by a single operator. The support frames is thus well suited for a curb-side pick up operation.

In the unload position, the contents of the interior storage area can be emptied from a selected one or more of the compartments. In one preferred arrangement, the interior partition pivots open during movement of the body toward the unload position, thereby permitting waste materials confined by the partition to be emptied. Lock means is provided to releasably retain the partition in the closed position during movement of the body. The lock means thereby serves, when desired, to prevent waste materials confined by the partition to be emptied. The lock means is controlled by a single operator from a location outside the body.

Other features and advantages of the invention will become apparent upon considering the accompanying drawings, description, and claims.

BRIEF DESCRIPTION OF THE DRAWINGS

FIG. a side view of a vehicle for collecting and transporting waste materials having a multiple chamber body embodying the features of the invention shown in its load position.

DESCRIPTION OF THE PREFERRED EMBODIMENT

Figure 1:
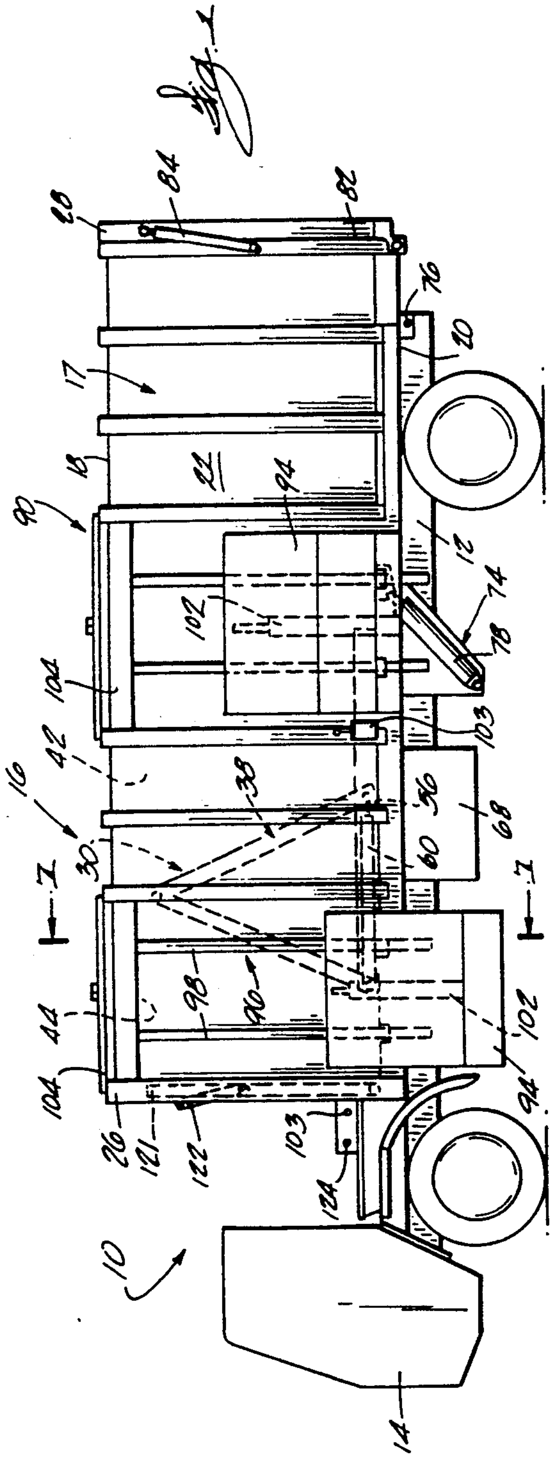

A vehicle 10 for collecting and transporting waste materials is shown in FIG. 1. The vehicle 10 includes a wheeled chassis 12. A driver's compartment 14 is located at the front end of the chassis 12, as is the engine (not shown) that propels the vehicle 10.

A multiple chamber body 16 is carried on the chassis 12 behind the driver's compartment. Waste materials are loaded into the body 16 for transportation to a collection cite. For this purpose, the body 16 includes a housing 17 having a top wall 18, a bottom wall 20, side walls 22 and 24, front wall 26, and rear wall 28 (see also FIGS. 2 and 7). The walls collectively define an interior storage area 30 for receiving the waste materials.

Figure 3:
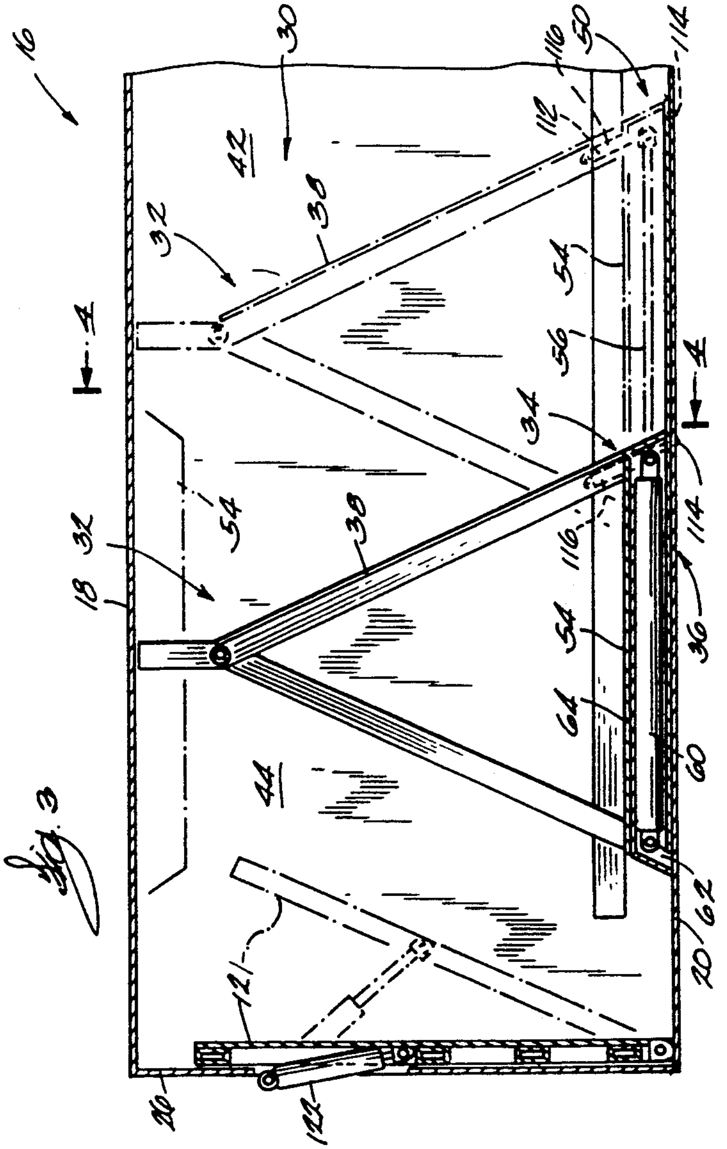
FIG. 3 is an enlarged section view of the multiple chamber body carried by the vehicle taken generally along line 3—3 in FIG. 2.

As best shown in FIG. 3, in accordance with the invention, first means 32 extends in the interior storage area 30 for creating at least two compartments 42 and 44 within the interior storage area 30. Therefore, different types of waste materials can be collected and segregated within the storage area 30.

Second means 34 is operatively connected with said first means 32 for moving the first means 32 to selectively alter the respective sizes of said two compartments 42 and 44. Therefore, the size of the compartments 42 and 44 can be varied depending upon the particular task at hand.

Third means 36 is operatively connected with the second means 34 for moving the first means 32 within the interior storage area 30 from a location outside the housing 17. The body 16 is thus self-contained and does not rely upon exterior equipment or additional manpower to vary the respective sizes of the compartments.

Figure 4:
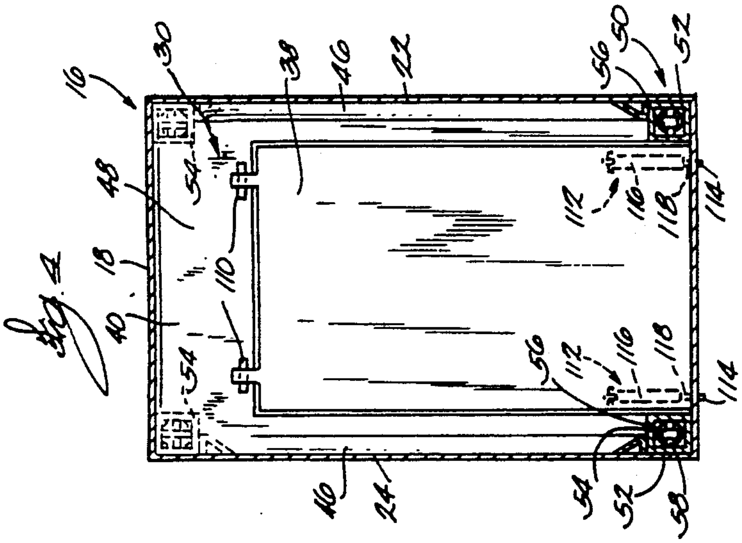
FIG. 4 is a section view of the multiple chamber body taken generally along line 4—4 in FIG. 3.

The first, second, and third means 32, 34, and 36 as above generally described can be variously constructed. In the illustrated embodiment (as best shown in FIGS. 3 and 4), the first means 32 includes an interior wall 38 supported by a frame 40. Together, the interior wall 38 and frame 40 create a partition which divides the storage area 30 into two compartments 42 and 44. As also shown in FIG. 1, the first compartment 42 extends from the rear wall 28 toward the interior wall 38, and the second compartment 44 extends from the front wall 26 toward the interior wall 38.

In the illustrated arrangement, the first compartment 42 can, in use, receive a recyclable waste material, such as glass. The second compartment 44 can receive a different recyclable waste material, such as paper.

Also as is best shown in FIGS. 3 and 4), the frame 40 includes two A-frame side supports 46 and an interconnecting center support wall 48. The interior wall 38 is carried by the center support wall 48. As will be described in greater detail below, the interior wall 38 is preferably hinged to the center support wall 48 for pivotal movement.

In the illustrated embodiment (see FIGS. 3, 4, and 5), the second means 34 includes guide means 50 for moving the frame 40 and, with it, the interior wall 38. More particularly, the guide means 50 takes the form of two parallel tracks 52 formed on the side walls 22 and 24 of the housing 17 near the bottom wall 20. Alternatively, of course, the parallel tracks 52 could be formed near the top wall 18 of the housing 17 and serve the same function as will be described below.

Figure 5:
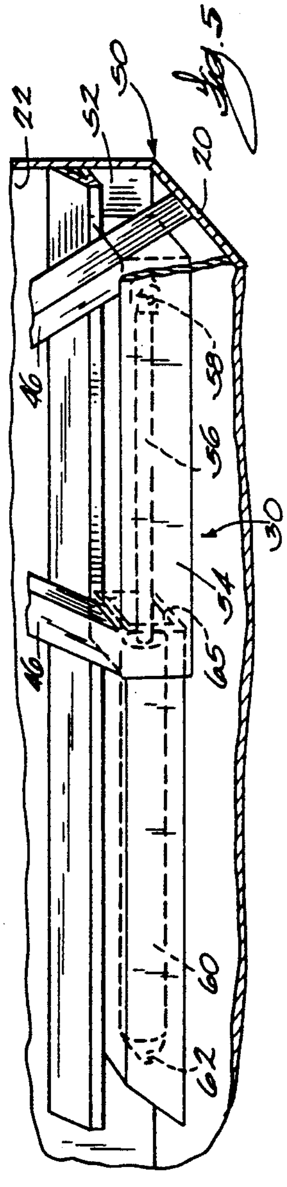
FIG. 5 is an enlarged perspective view, with portions broken away and in section, of the guide means associated with the multiple chamber body embodying the features of the invention.

In this arrangement, and still referring principally to FIGS. 3, 4, and 5, a guide shoe 54 is affixed to each corner of the frame 40. The guide shoes 54 are engaged within the parallel tracks 52. The frame 40, and thus the attached interior wall 38, is thereby carried along the tracks 52 for movement within a range of positions between a first, or forward, position (shown in solid lines in FIG. 3) and a second, or rearward, position (shown in phantom lines in FIG. 3). Movement of the frame 40 and attached wall anywhere within this range adjusts the relative sizes of the two compartments 42 and 44.

In the illustrated embodiment, the third means 36 includes a ram 56 attached to each of the guide shoes 54 by a pin 58. Each ram 56 is, in turn, operatively connected with a conventional fluid pressure cylinder 60 (see FIG. 8).

As can be best seen in FIG. 3, in response to the fluid pressure exerted by the cylinders 60, the rams 56 are movable within a range of positions between a retracted position within the associated cylinder 60 (shown in solid lines in FIG. 3) and an extended position from the associated cylinder 60 (shown in phantom lines in FIG. 3). Movement of the ram 56, in turn, moves the associated guide shoe 54 and, with it, the frame 40 and interior wall 38, between the above described first and second position within the storage area 30.

As can be best seen in FIGS. 3 and 5, each pressure cylinder 60 is attached within the associated track 52 by means of a bracket 62 affixed to the bottom wall 20 of the body housing 17. Each cylinder 60 is also enclosed within a fixed protective housing 64 having an open end 65 through which the associated ram 56 extends. The housing 64 protects the cylinder from contact with the materials located in the storage area 30.

As can be best seen in FIG. 5, the associated guide shoe 54 is telescopically mounted about the protective housing 64 for movement along the housing 64 in response to actuation of the ram 52. The guide shoe encloses the ram 52 to protect the ram 52 from contact with the materials located within the interior area 30 when the ram 52 is moved toward its extended position.

Figure 2:
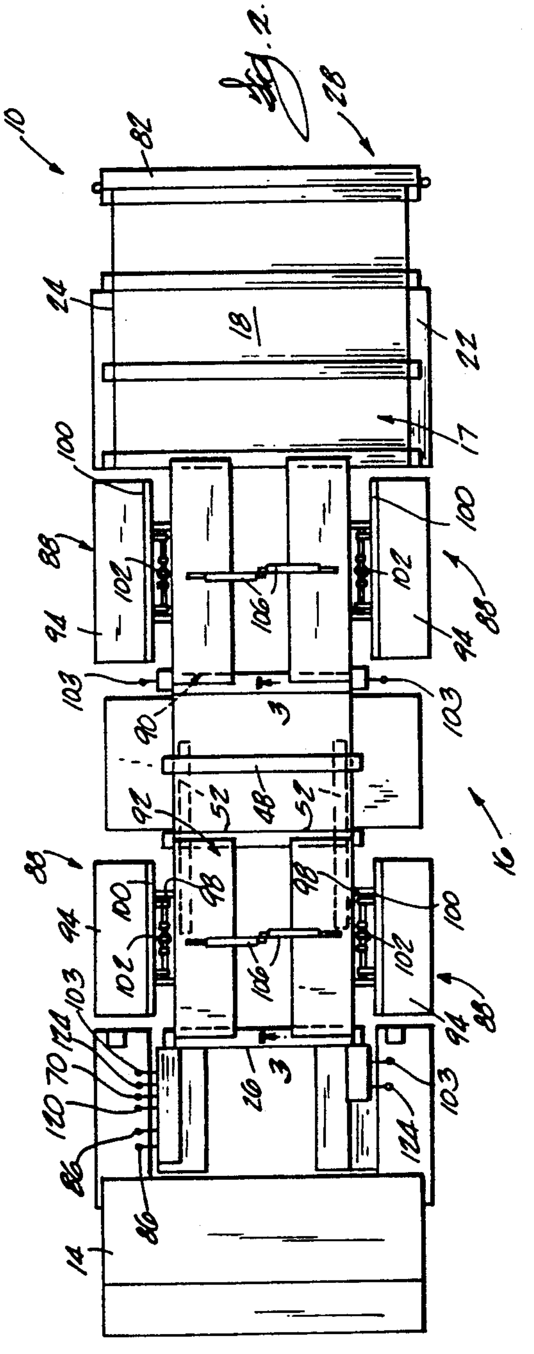
FIG. 2 is a top view of the vehicle shown in FIG. 1.
Figure 8:
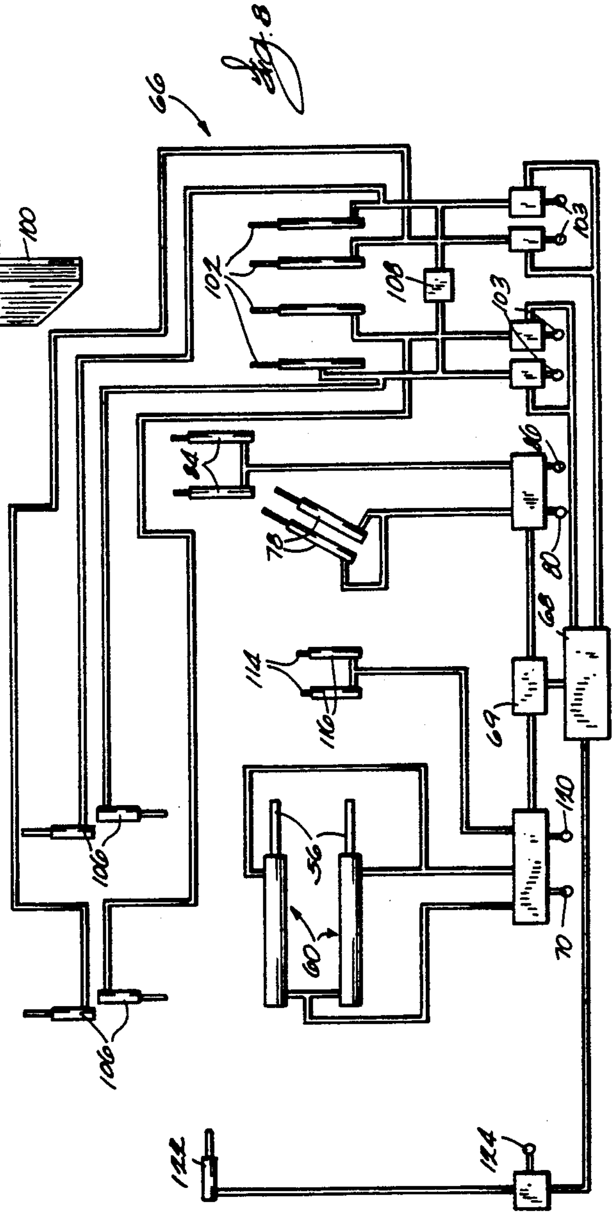
FIG. 8 is a schematic diagram of the fluid pressure circuit associated with the vehicle shown in FIG. 1.

As generally shown in FIG. 8, the cylinders 60 are part of a fluid pressure circuit 66 that actuates the ram 56. Preferably, the fluid pressure used is hydraulic. In this arrangement, the circuit 66 is conventional in configuration and operation, employing a hydraulic pump 69 to deliver hydraulic fluid from a source 68 carried by the chassis 12 (see FIG. 1, too) to the cylinders 60 for controlling movement of the ram 56. The circuit 66 includes a frame cylinder controller 70 carried on the chassis 12 (as best shown in FIG. 2) for selectively controlling the flow of hydraulic fluid to the cylinders 60.

The controller 70 can be conventionally constructed and comprise, for example, a manually controlled hydraulic valve for selectively conveying hydraulic fluid under pressure to the cylinders 60.

Using the controller 70, the interior wall 38 can be selectively positioned within the storage area 30 by a single operator automatically from a location outside the housing 17.

Figure 6:
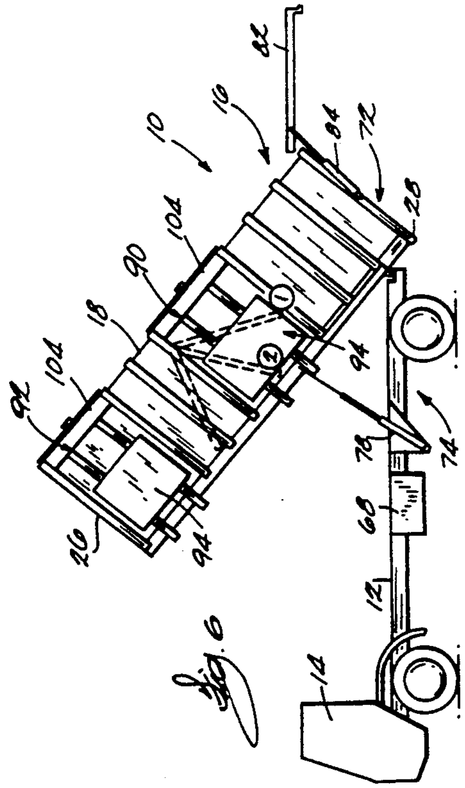
FIG. 6 is a side view of the vehicle shown in FIG. 1 with the multiple chamber body located in its unload position.

The rear wall 28 of the housing 17 includes an opening 72 (see FIG. 6) through which the materials collected in the storage area 30 are emptied. In this arrangement, the vehicle 10 further includes dumping means 74 for moving the body 16 relative to the chassis 12 between a load, or generally horizontal, position (as shown in FIG. 1) and an unload, or generally upright or tilted, position (as shown in FIG. 6). When in the unload position, the contents of the storage area 30 are emptied by gravity through the rear opening 72.

The dumping means 74 can be variously constructed. In the illustrated embodiment, the dumping means 74 includes a rear hinge 76 which attaches the body 16 to the chassis 12 in a manner which permits tipping of the body 16 on the chassis 12 between the load and the unload positions. One or more dump cylinders 78 are attached to the body 16. In response to fluid pressure, again preferably hydraulic, the dump cylinder(s) 78 pivot the body 16 about the hinge 76 between the load and unload positions. As shown in FIG. 8, the dump cylinder(s) 78 are interconnected with the fluid pressure circuit 66, and a dump cylinder controller 80 is carried by the chassis 12 for operation by a single operator.

A tailgate 82 is attached about the rear opening 72 for movement between an open position (shown in FIG. 6) and a closed position (shown in FIG.

One or more tailgate cylinders 84, which also form a part of the fluid pressure circuit 66, are actuated by the operator (via controller 86) or can be automatically sequenced to move the tailgate 82 between its open and closed positions during unloading operations.

The vehicle 10 also includes loading means 88 for conveying waste materials into a desired one or both of the compartments 42 and 44 when the body 16 is in its load position.

In the illustrated embodiment (see FIGS. 1, 2, and 7), a series of loading openings 90 and 92 are formed in the top wall 18 and adjacent part of the side walls 22 and 24 of the housing 17. A first pair of the loading openings 90. oppositely spaced on the top wall 18, communicate with the first chamber 42. Likewise, a second pair of oppositely spaced loading openings 92 communicate with the second compartment 44.

Four trash containers 94 are carried on the side walls 22 and 24 of the housing 17, one associated with each loading opening 90 and 92. Lift assemblies 96 are associated with each trash container 94 for moving the trash container 94 between a working mode position (shown in solid lines as position A in FIG. 7) and a dumping mode position (shown in phantom lines as position B in FIG. 7).

Each lift assembly 96 includes a pair of tracks 98 to which a container support 100 is movably attached. A trash container 94 is removably attached to each container support 100 by means of brackets 101 or the like. A lift cylinder 102, interconnected with the fluid (preferably hydraulic) pressure circuit 66, individually moves the container support 100 up and down along the tracks 98 between the working mode and dumping mode positions. Controllers 103 carried on the chassis 12 independently actuate the desired lift cylinders 102.

Alternatively, other mechanisms could be used to independently move the container supports 100. For example, a hydraulic motor with a chain drive assembly could be used.

Figure 7:
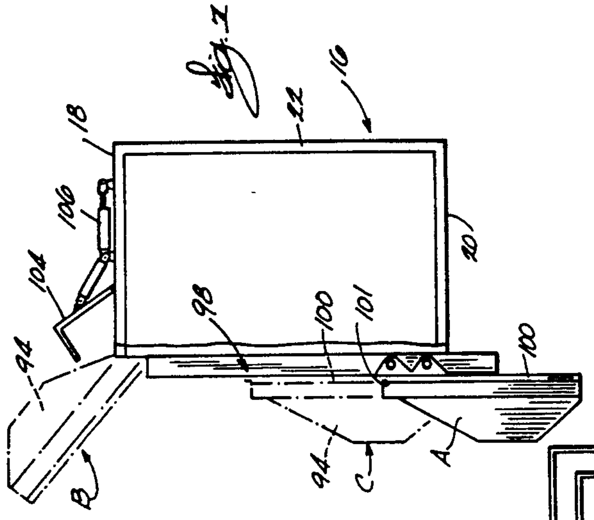
FIG. 7 is a side section view of the material loading assembly carried by the vehicle and taken generally along line 7—7 in FIG. 1.

In the working mode position (position A in FIG. 7), the trash container 94 is located near the ground for the ease of loading waste materials. As shown in FIG. 7, as the dump mode position (position B in FIG. 7) is approached, the trash container 94 is progressively tipped to dump its contents through the associated dumping opening 90 and 92 into the associated chamber 42 and 44.

As also shown in the illustrated embodiment, closure doors 104 can be provided for each dumping opening 90 and 92. Each door 104 is preferably attached to a fluid pressure cylinder 106 to open the door 104 in sequence as the container 94 approaches the dumping opening 90 and 92. In the illustrated embodiment, the cylinder 106 is actuated by hydraulic pressure. Alternatively, pneumatic pressure could be used.

As shown in FIG. 8, the lift assemblies 96 are preferably interlocked with the gear selector 108 of the vehicle 10. This interlock prevents the movement of the trash containers 94 into the work mode position unless the vehicle 10 is in the desired slow moving working condition. In higher speed transit, the lift assemblies 96 retain the trash containers in a higher, intermediate position (shown in phantom lines as position C in FIG. 7).

The trash containers 94 can be released, when desired, from the container support 100 for cleaning and replacement.

In the illustrated and preferred embodiment (see FIG. 4), the interior wall 38 is pivotally connected to the center support of the frame 40 by means of pins 110. This provides pivot means for moving the interior wall 38 relative to the frame 40 between a position opening communication between the two adjacent compartments 42 and 44(shown in phantom lines as position 1 in FIG. 6) and a position closing communication between the adjacent compartments 42 and 44 (shown in phantom lines as position 2 in FIG. 6).

In the illustrated and preferred embodiment, the pivot means permits the interior wall 38 to move from the closed toward the opened position in response to gravity during movement of the body 16 toward the unload position. Likewise, the pivot means permits the interior wall 38 to move in response to gravity from the opened position toward the closed position in response to movement of the body 16 toward the load position.

As can be seen in FIG. 6, when the body 16 is moved toward its unload position, and the tailgate 82 opened, the contents of the first chamber 42 are emptied through the rear opening 72. Further, when the interior wall 38 moves from the closed to the opened position during movement of the body 16 toward the unload position, the contents of the second compartment 44 are also permitted to enter the first compartment 42 to be emptied through the rear wall opening 72.

In this arrangement, the body 16 further includes lock means 112 for releasably retaining the interior wall 38 in the closed position to prevent the contents of the second compartment 42 from entering the first compartment 44 during movement of the body 16 toward the unload position. The operator can thereby selectively control the sequence of unloading of the various waste materials carried by the body 16.

The lock means 112 can be variously constructed. In the illustrated embodiment, the lock means 112 includes locking pins 114 which are controlled by fluid pressure (preferably hydraulic) cylinders 116. The locking pins 114 are carried by the interior wall 38 and engage holes 118 in the frame 40 when the interior wall 38 is in its closed position. This serves to secure the interior wall 38 in the closed position.

The pressure cylinders 116 are interconnected with the fluid pressure circuit 66. The cylinders 116 are operated by a controller 120 carried by the chassis 12 to move the locking pins 114 into and out of engagement with the holes 118. The lock means 112 can thereby be controlled by a single operator from outside the housing 17.

As shown in FIGS. 1 and 3. a movable packer panel 121 is provided for compacting the waste materials retained in the compartment 44. The packer panel 121 is operated by one or more packer cylinders 122 which (as shown in FIG. 8) are interconnected with the fluid circuit 66. The packer cylinder(s) 122 are operated by controller 124 carried on the chassis.

As with the controller 70, the controllers 80, 86, 103, and 124 can take the form of manually controlled hydraulic valves for selectively conveying hydraulic fluid to the respective cylinders.

The various aspects of the invention therefore provide a multiple compartment body 16 well suited for the collection of different types of recyclable waste materials. The body 16 can be affixed to a chassis 12 (as shown in the drawings), or it can be free standing or removably carried on a flatbed truck or the like.

The size of the individual compartments of the body 16 can be selectively altered without additional manpower or reliance upon external equipment. It is thus well suited for curb-side operation. The movable partition which embodies the invention is essentially infinitely adjustable, to meet the varying demands of the moment.

Various features of the invention are set forth in the following claims.

I claim:

1. A multiple compartment storage assembly comprising a support frame, a housing on the frame having a front wall, a bottom wall, a top wall, an end wall, and side walls collectively defining an interior storage area, the end wall being movable between a position opening the interior storage area and a position closing the interior storage area, partition means including an interior well extending between the side walls for creating first and second compartments having confines within the interior storage area, the confines of the first compartment extending between the front wall and the interior partition wall, and the confines of the second compartment extending between the interior partition wall and the end wall, a first opening formed in the top wall of the housing to communicate only with the first compartment for receiving material into the first compartment, a second opening formed in the top wall of the housing to communicate only with the second compartment for receiving material into the second compartment, first transport means associated with the first opening for dumping material only into the first compartment through the first opening, the first transport means including a first container carried on one side wall of the housing, a second container carried on another side wall of the housing, and first actuator means connected to the first and second containers for independently raising and lowering each first and second container between a lowered loading position for receiving material and a raised dumping position for emptying the received material into the first compartment through the first opening, second transport means associated with the second opening and being operable independent of the first transport means for dumping material only into the second compartment through the second opening, the second transport means including a third container carried on one side wall of the housing adjacent the first container, a fourth container carried on another side wall of the housing adjacent the second container, and second actuator means connected to the third and fourth containers for independently raising and lowering each third and fourth container independent of the first and second containers between a lowered loading position for receiving material and a raised dumping position for emptying the received material into the second compartment through the second opening, means for moving the housing on the frame between a generally horizontal load position to receive material into the storage area through the first and second openings and a generally tilted unload position to empty materials from the storage area through the end wall when the end wall is in its opened position, and means for moving the interior partition wall between a position closing communication between the compartments and a position opening the communication including locking means for keeping the partition wall in its closed position as the housing moves from its load position to its unload position to hold materials in the first compartment while materials from the second compartment are emptied through the open end wall, and control means for releasing the locking means from a location outside the interior storage area to release materials from the first compartment into the second compartment for emptying through the open end wall when the housing is in its unload position.

2. A multiple compartment storage assembly according to claim 1 and further including a first door associated with the first opening and a second door associated with the second opening, each door being independently operable between an opened position with respect to the associated opening and a closed position covering an associated opening, and actuator means associated with each first and second doors and being operable in association with the first and second transport means for moving the associated first or second door from its closed toward its opened position as an associated container moved from its lowered loading position to its raised dumping position.

3. A multiple compartment storage assembly according to claim 1 or 2 and further including means for moving the partition for altering a respective size of the first and second compartments.

* * * * *